United States Patent [19]
Brown et al.

[11] Patent Number: 5,244,169
[45] Date of Patent: Sep. 14, 1993

[54] INFLATABLE STRUCTURE PARAGLIDER

[75] Inventors: Glen J. Brown, Santa Cruz; Roy Haggard, Nuevo, both of Calif.

[73] Assignee: Vertigo, Inc., Lake Elsinore, Calif.

[21] Appl. No.: 883,341

[22] Filed: May 15, 1992

[51] Int. Cl.⁵ .................... B64C 3/30; B64D 17/02
[52] U.S. Cl. ................................. 244/146; 244/123
[58] Field of Search ............. 244/142, 149, 146, 900, 244/902, 123, 117 R

[56] References Cited

U.S. PATENT DOCUMENTS

| | | |
|---|---|---|
| 1,905,298 | 4/1933 | McDaniel ........................ 244/146 |
| 4,363,458 | 12/1982 | Jones et al. . |
| 4,406,433 | 9/1983 | Radkey et al. .................. 244/146 |
| 4,708,078 | 11/1987 | Legaignoux et al. ........... 244/145 |
| 4,768,739 | 9/1988 | Schnee ............................ 244/146 |
| 4,846,424 | 7/1989 | Prouty ............................ 244/145 |
| 4,863,119 | 9/1989 | Case et al. . |
| 4,865,272 | 9/1989 | Schwarz ......................... 244/145 |
| 5,028,018 | 7/1991 | Krebber ......................... 244/146 |

*Primary Examiner*—Galen Barefoot
*Attorney, Agent, or Firm*—William W. Haefliger

[57] ABSTRACT

A paraglider having ram-air inflated left and right wings and supported above a pilot by suspension lines, the wings consisting of foldable and flexible sheet material and defining front openings to receive ram-air to inflate the wings in flight, the combination comprising; fluid inflated spar tube means extending spanwise in stiffening relation to the wings, to assist in supporting and shaping the wings in flight; spar tube means extending in such proximity to the front openings as to resist tuck under and collapse of the wings, at low angles of attack; spar tube means consisting of material which is flexible and foldable when the spar tube means is not inflated.

9 Claims, 4 Drawing Sheets

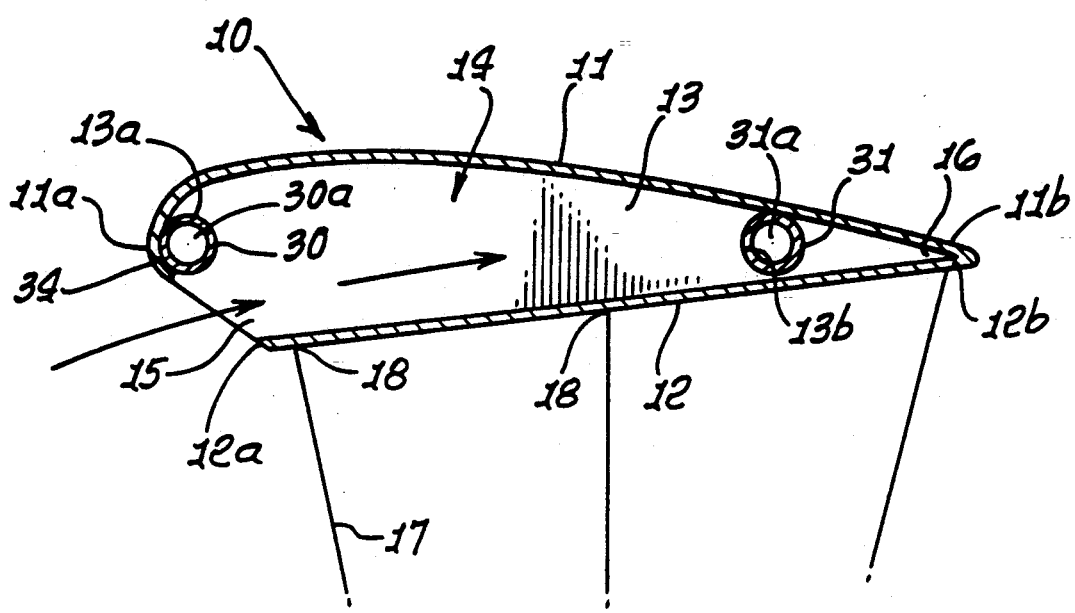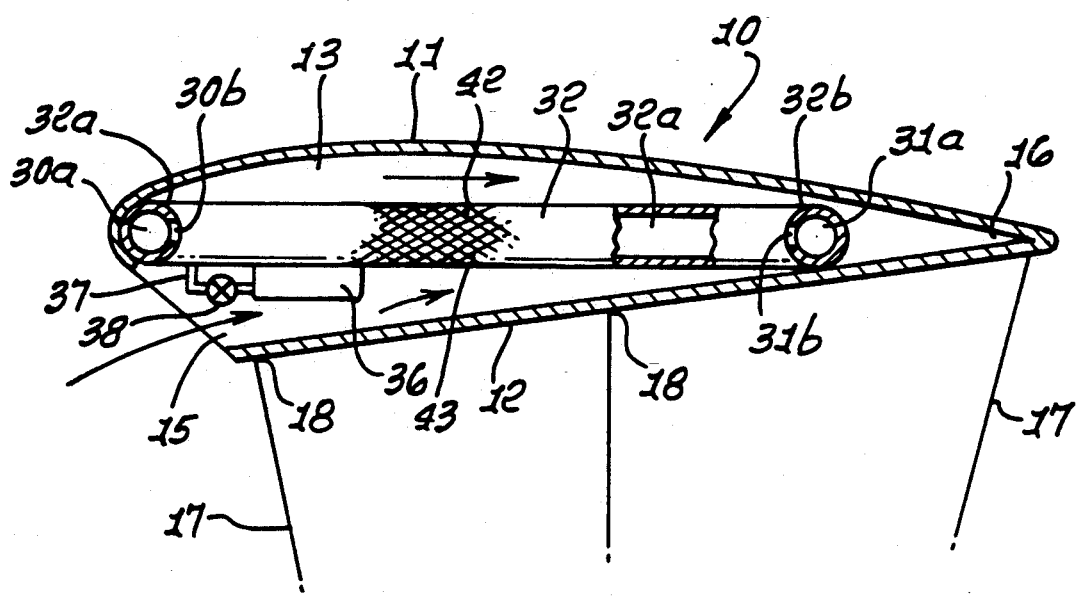

INFLATABLE STRUCTURE PARAGLIDER

BACKGROUND OF THE INVENTION

This invention relates generally to paragliders, and more particularly to method and apparatus for preventing unwanted collapse of the ram-air inflated wings of paragliders.

Paragliders are ram-air inflated wings without rigid internal structure and supported above the pilot only by suspension lines. They are deployed on the ground and inflated with a running start by the pilot. Paragliders are similar to the parafoil gliding parachutes used for sport and military purposes, but are generally not suitable for deployment from freefall. Paragliders are currently used primarily for recreational purposes, although other military and civilian applications are likely in the future.

The paraglider's lack of rigid structure is a benefit in terms of transportability, but is also a detriment in terms of safety and performance. The leading edges are known to tuck under during certain flight conditions. Leading edge tuck is a safety issue and also limits the speed range of the glider. A large number of suspension lines are necessary to support the paraglider and to maintain an optimum shape. The suspension lines produce a significant portion of the total drag of the glider, which could be reduced if additional structure were present.

There is need for a means to prevent "tuck under" of paraglider wings, in flight, which can lead to wing collapse, and for means enabling substantial reduction in the number of suspension lines required.

SUMMARY OF THE INVENTION

It is a major object of the invention to provide a lightweight wing stiffener means located to prevent tuck-under and/or inflated wing collapse, in paraglider flight. In this regard, a paraglider wing typically consists of flexible and foldable sheet material and defines a spanwise row of inlet openings to receive so-called ram air acting to inflate the wings in flight. The invention basically comprises:

a) fluid inflated spar tube means extending spanwise in stiffening relation to the wings, to assist in supporting and shaping the wings in flight, b) such spar tube means extending in such proximity to the front openings as to resist tuck under and collapse of the wings, at low angles of attack, c) the spar tube means consisting of material which is flexible and foldable when the spar tube means is not inflated.

As will appear, the tube means typically includes one or more lightweight spar tubes, each tube including an inner inflated tube to contain inflating fluid pressure such as air pressure, and an outer protective sheath extending about the inflatable tube to be expanded into stiff form. The outer sheath may consist of braided, woven or wound synthetic yarn.

It is another object to provide spar tube means that includes i) a forward spanwise extending inflated tube proximate leading edges defined by the wings, and ii) a rearward spanwise extending and inflated tube located within the wings.

In addition, the spar tube means may include a chordwise extending and inflatable spar tube connected with said forward and rearward tubes, medially of their spanwise lengths.

As will appear, the paraglider wings, when inflated, typically have arching configuration; and it is yet another object to provide spar tube means that include forward and rearward spar tubes which are inflated into arching configuration corresponding to such wing arching configuration.

These and other objects and advantages of the invention, as well as the details of an illustrative embodiment, will be more fully understood from the following specification and drawings in which:

DRAWING DESCRIPTION

FIG. 2 is an enlarged section taken on lines 2—2 of FIG. 1;

FIG. 3 is an enlarged section taken on lines 3—3 of FIG. 1;

DETAILED DESCRIPTION

Figure 1:
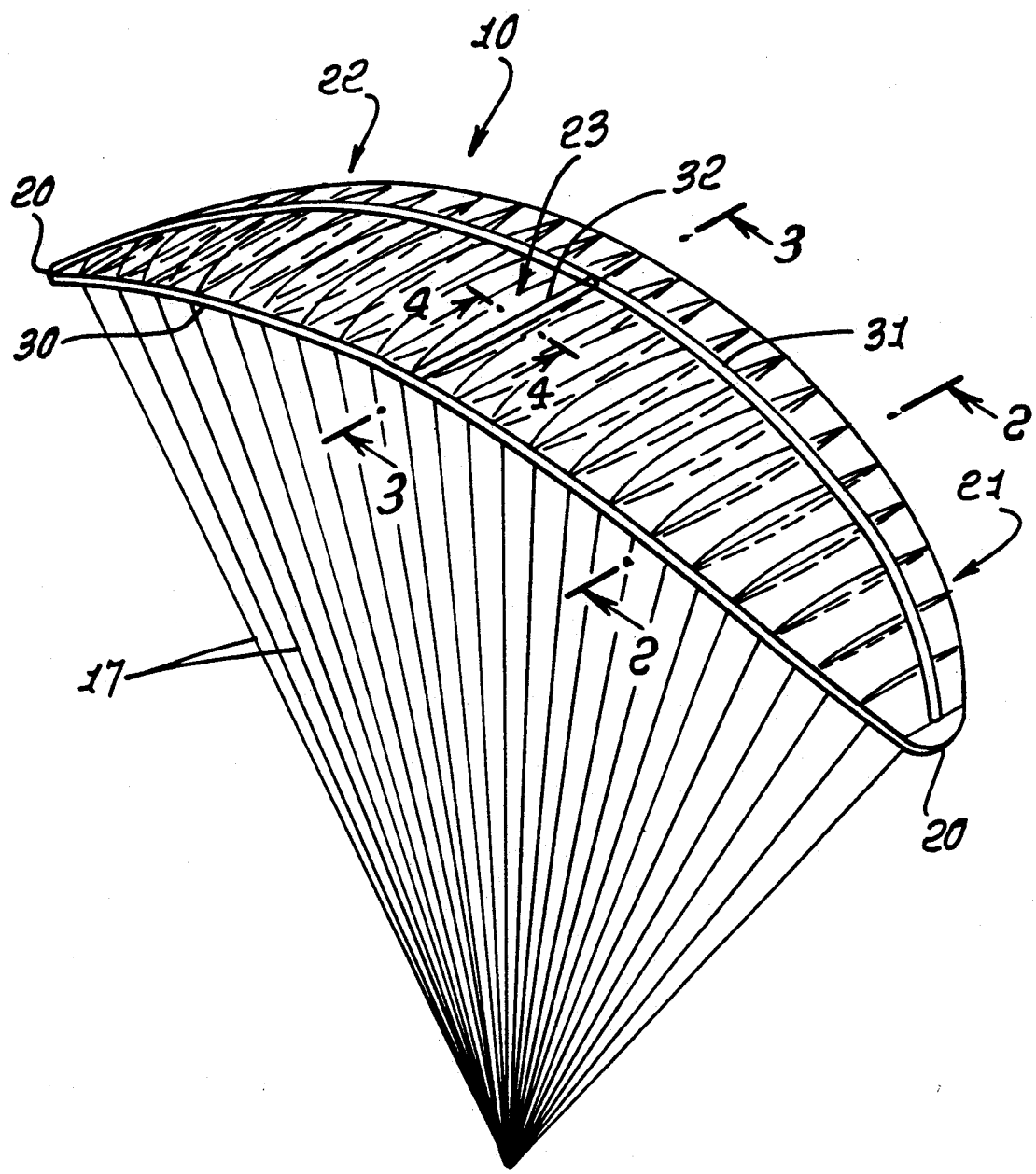
FIG. 1 is a perspective view of a paraglider, in flight, and incorporating the invention.

The parafoil 10 shown in FIGS. 1-3 includes an upper fabric panel 11, a lower fabric panel 12 spaced below the upper panel, and upright connector panels 13 joined at their edges to panels 11 and 12, and spanwise laterally spaced apart. The panels 13 extend generally forwardly and rearwardly, and form with panels 11 and 12 air inflated chambers or pockets 14 having open forward ends 15 and closed rearward ends 16. Openings 15 face forwardly and downwardly. In this regard, load support strands or lines 17 are connected to the parafoil at forward and rearwardly spaced locations 18, proximate lower edges of the connector panels. See FIG. 2. The panels 11, 12, and 13 may consist of Nylon fabric, or other strong lightweight fabric, that is easily foldable. The upper and lower panels define parafoil forward edges 11a and 12a, and rearward edge or edges at 11b and 12b, which are joined. See FIG. 2.

Successive panels 13 have decreasing length toward the tips 20 of the paraglider left and right wings 21 and 22, as is clear from FIG. 1. Also the paraglider has arching configuration, whereby the wing tips 20 are below the level of the mid-portion 23 of the glider.

In accordance with the invention, fluid (such as air) pressure inflated spar tube means is provided to extend spanwise in stiffening relation to the arching wings, to assist in supporting and shaping the wings in flight. In this regard, the spar tube means extends in such proximity to the front ram-air openings 15 as to resist "tuck under" and collapse of the wings as during maneuvering in flight.

Figure 6:
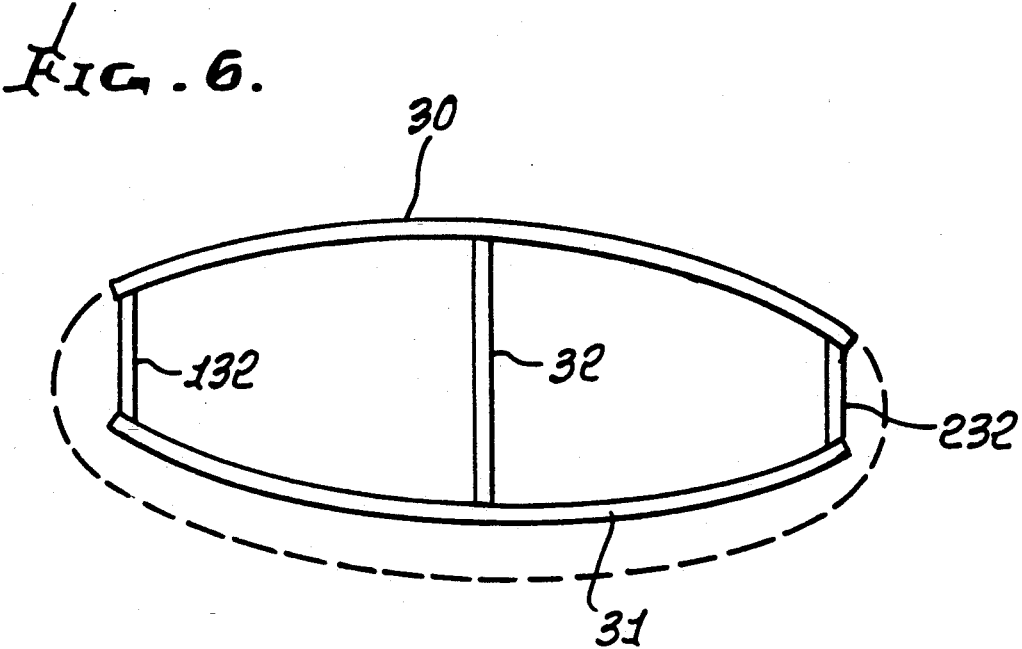
FIG. 6 is a plan view of a modified structure.
Figure 7:
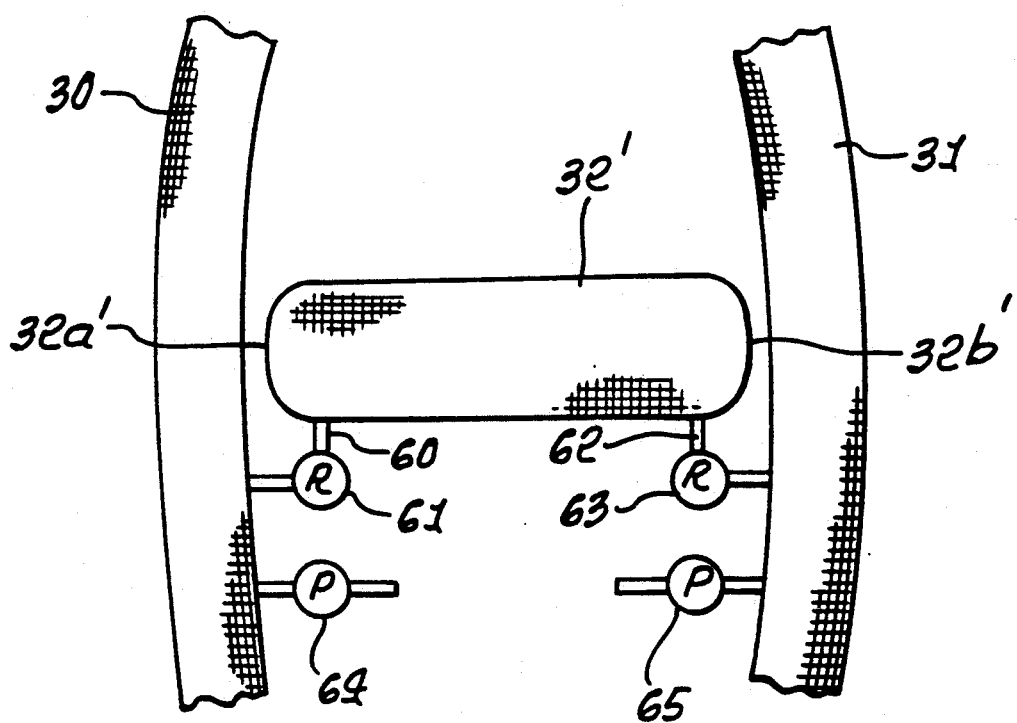
FIG. 7 is a plan view of a further modified structure.

In the form of the invention shown, the spar tube means includes a forward and spanwise extending tube 30 at or proximate the leading edges defined by the left and right wings 21 and 22; a rearward and spanwise extending tube 31 located within the wings near their aft ends; and a third and chordwise extending spar tube 32 connected with tubes 30 and 31, medially of their spanwise lengths. Tube 32 is at the uppermost arching medial extent of the paraglider, as shown, and it maintains the spacing between the forward and rearward tubes 21 and 22. It may also serve to maintain pressure in tubes 21 and 22. FIG. 3 shows the tube interiors 30a, 31a and 23a in intercommunication, as via tube openings 30b and 31b. In FIGS. 2 and 3, tube 30 is located to form the convex leading edge 34 of the paraglider wings, and since the tube 21 is stiff, the leading edge is stiff, and resists tuck under, toward the air inlets 15, whereby the latter remain open in flight to resist collapse of the paraglider. Tube 30 extends through forward circular openings 13a in the panels 13 and is attached to forwardmost extent of top panel 11; and tube 31 also extends through rearward circular openings 13b in the panels 13. Tube 32 is joined to tube 30, at 32a; and joined to tube 31, at 32b. All three tubes may have the same outer diameter; and tube 32 holds tubes 30 and 31 in forwardly and rearwardly spaced relation, defining an inflated three-tube wing stiffening framework, which is lightweight; also, the framework is flexible and foldable when not inflated. FIG. 3 also shows an optional means to inflate the tube, i.e. a fluid pressure vessel 36 carried by tube 32, and communicating with the interior of tube 32, via a duct 37 and a valve 38 in the duct. Optionally, a tube 32', replacing tube 32, may itself be used as a pressure vessel to maintain pressure in tubes 30 and 31 during long duration flight. See FIG. 7 showing vessel 32' having closed ends 32a' and 32b' non-integral with tubes 30 and 31. Line 60 connects 32' and 30 to deliver pressurized air or other gas to 30, as via a regulator 61; and line 62 connects 32' to 31 to deliver pressurized air or other gas to 31, via a regulator 63. Pressure relief valves appear at 64 and 65, connected to 30 and 31. FIG. 6 shows the provision of multiple chordwise extending tubes 32, 132 and 232. Tubes 132 and 232 are like tubes 32, but located at or near the ends of tubes 30 and 31, and attached thereto.

Figure 4:
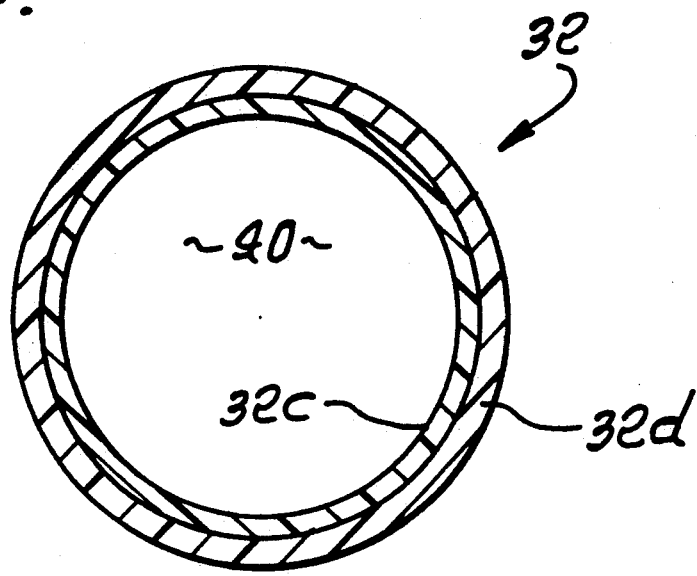
FIG. 4 is an enlarged section taken on lines 4—4 of FIG. 1.
Figure 5:
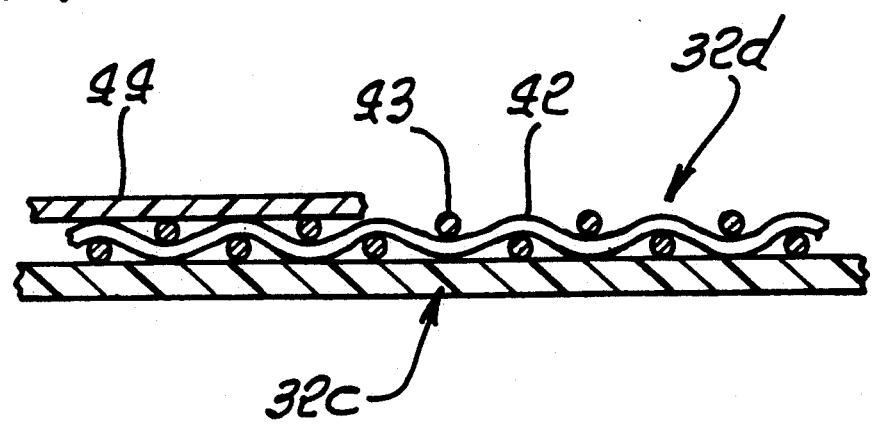
FIG. 5 is a further enlarged section taken through the wall of stiffener tubing as seen in FIGS. 1-4.

FIGS. 4 and 5 show a typical construction of the tubes 30–32. As shown, the tube 32 assembly includes inner tube 32c to contain inflating air pressure, in the tube interior 40. The assembly also includes an outer, protective sheath 32d extending about inner tube 32c to be expanded by tube 32c into stiff form, i.e. to resist tube bending, whereby tubes 30 and 31 tend to retain their arching configuration, and the desired paraglider wing arching configuration, in flight. FIG. 5 shows the outer sheath 32d to have woven configuration, with synthetic fiber strands 42 crossing over and interwoven with strands 43. See also FIG. 3 showing such strands extending spirally about and along the tube 32 length, i.e. braided. Other strands or fibers may be added to the braided strands in a longitudinal (lengthwise) orientation to adjust or tailor the bending stiffness of the tube. The strands may be braided, woven or wound.

The braided fibers form the structure of the tube as a pressure vessel, and are oriented with a bias angle of 63.4 degrees from the longitudinal axis of the tube. The additional longitudinal fibers are added to tailor the bending characteristics of the tube and may be added non-uniformly around the circumference of the tube. The process that allows the selective addition of longitudinal fibers in a braided structure is known as tri-axial braiding.

The inner liner 32c consists of synthetic resin or plastic films extruded, or blown-extruded, in tubular form. Linear Low-Density Polyethylene (LLDPE) is one good example. The braid can be woven directly onto the inner liner and bonded in place with a light coating of adhesive.

The inflated spar tubes are important to the invention. As referred to, they consist of an outer layer of high strength fibers with optimized orientation, an inner liner of impermeable material, tube end terminations, and a connection or connections for filling and pressure regulation. The liner and end terminations prevent the escape of the inflation gas, while the fiber outer layer has the strength to provide for high pressurization and the stiffness to give the desired bending characteristics. The inflation pressure primarily determines the buckling condition, while the fiber schedule determines the prebuckling shape of the tube under applied loads. Typical inflation pressures are between 5 and 20 psi.

SUMMARY OF THE INVENTION

The invention provides a structure of several inflated spar tubes internal to a ram-air inflated wing The tubes are closed containers for gas pressure. The wing itself continues to be inflated by ram-air, but receives additional support and shape control from the internal spar tube structure.

The internal structure preferably includes a minimum of three tubes disposed as described. One spanwise tube is located at the leading edge, forms the leading edge radius and the upper surface of the ram-air inlet. A second spanwise tube is located aft of mid-chord, and preferably as far aft as its diameter will allow, within the airfoil contour. A third tube is oriented chordwise at mid-span, separating the two long spanwise tubes. With an elliptical planform (for example), the two spanwise tubes (spars) curve or taper continuously toward one another, i.e. toward the wing tips. These curves are maintained by the center chordwise tube in compression, tending to spread the spars, and each rib 13 providing tension between the spars, bending the spars toward one another.

The resulting structure benefits the glider in the following ways:

Resistance to tuck-under. The additional stiffness in the leading edge resists tuck-under and collapse of the airfoil at low angles of attack.

Improved speed range. The stiffened leading edge allows operation at lower angle-of-attack, because the stagnation streamline can move to the upper surface without distortion or collapse of the airfoil. The ability to operate at low angle-of-attack provides an improved speed range, with the ability to penetrate areas of sinking air, and to fly through higher velocity winds when necessary. This is a benefit for both safety and performance.

Improved glide ratio. The bending resistance of the spars allows a reduction in the number of suspension lines, which reduces parasitic drag.

We claim:

1. In a paraglider having ram-air inflated left and right wings and supported above a pilot by suspension lines, the wings consisting of foldable and flexible sheet material and defining front openings to receive ram-air to inflate the wings in flight, the combination comprising a) fluid inflated spar tube mean extending spanwise in stiffening relation to the wings, to assist in supporting and shaping the wings in flight, b) said spar tube means extending in such proximity to said front openings as to resist tuck-under and collapse of the wings, at low angles of attack, c) said spar tube means consisting of material which is flexible and foldable when the spar tube means is not inflated,
d) said spar tube means including
  i) a forward spanwise extending inflated tube proximate leading edges defined by the wings, and
  ii) a rearward spanwise extending tube located within the wings,
e) said wings having spanwise arching configuration, said forward and rearward spar tubes being inflated into arching configuration corresponding to said arching configuration,
f) each of said wings including
  i) a top fabric panel,
  ii) a bottom fabric panel,
  iii) chordwise extending panels which are spaced apart spanwise of the wings, and which have upper and lower edges connected to said top and bottom panels,
  iv) said forward and rearward tubes extending through said chordwise extending panels,
g) said forward and rearward spar tubes being urged toward one another by said chordwise extending panels, whereby the spacing between said forward and rearward spar tubes tapers toward tips defined by said wings,
h) and including at least one chordwise extending spar tube connected with said forward and rearward tubes, medially of their spanwise lengths.

2. The combination of claim 1 wherein said wings have leading edges above and forwardly of said front openings, and said forward spar tube extends spanwise of the wings above and forwardly of said front openings, and proximate said wing leading edges.

3. The combination of claim 1 wherein each spar tube comprises
  $x_1$) an inner inflatable tube to contain inflating fluid pressure,
  $x_2$) an outer protective sheath extending about said inflatable tube to be expanded into stiff form.

4. The combination of claim 3 wherein said outer protective sheath consists of synthetic yarn, which is one of the following:
braided
woven
wound.

5. The combination of claim 1 wherein there are three of said chordwise extending tubes, one medially of said forward and rearward tubes, and the other two respectively located near opposite ends of said forward and rearward tubes.

6. The combination of claim 1 including an additional tube in the form of an air pressure containing vessel extending chordwise between said forward and rearward tubes.

7. The combination of claim 6 including a pressure line extending between said additional tube and at least one of said forward and rearward tubes, and a regulator in said line.

8. The combination of claim 6 including two pressure lines extending between said additional tube and said forward and rearward tubes respectively, pressure regulator in said lines, and pressure relief valves connected with said forward and rearward tubes.

9. In a paraglider having ram-air inflated left and right wings and supported above a pilot by suspension lines, the wings consisting of foldable and flexible sheet material and defining front openings to receive ram-air to inflate the wings in flight, the combination comprising
a) fluid inflated spar tube means extending spanwise in stiffening relation to the wings, to assist in supporting and shaping the wings in flight,
b) said spar tube means extending in such proximity to said front openings as to resist tuck under and collapse of the wings, at low angles of attack,
c) said wings have arching configuration, said spar tubes means including forward and rearward spar tubes which are inflated into arching configuration corresponding to said wing arching configuration,
d) each of said wings including
  i) a top fabric panel,
  ii) a bottom fabric panel,
  iii) chordwise extending panels which are spaced apart spanwise of the wings, and which have upper and lower edges connected to said top and bottom panels,
  iv) said spar tube means extending through said chordwise extending panels.

* * * * *